W. P. A. MACFARLANE.
FLUID PRESSURE BRAKE.
APPLICATION FILED MAY 10, 1909.
941,684.
Patented Nov. 30, 1909.
3 SHEETS—SHEET 3.
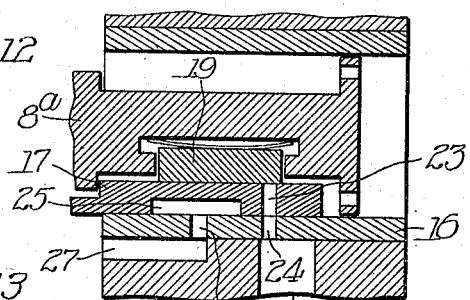
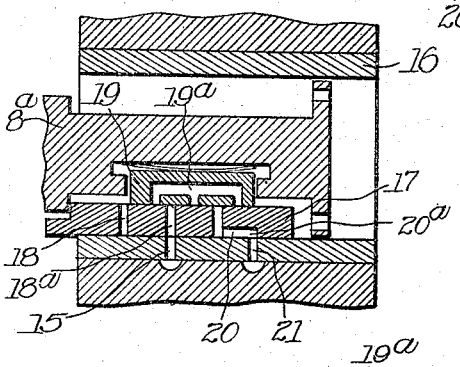
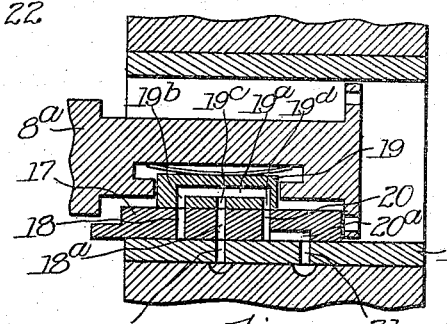
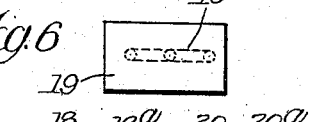
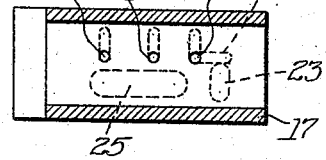
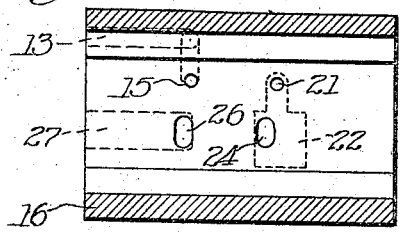
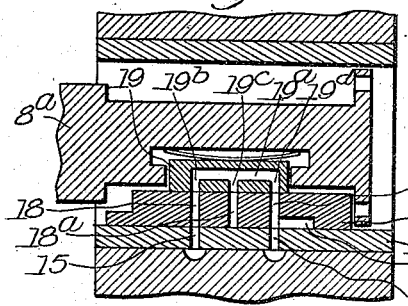
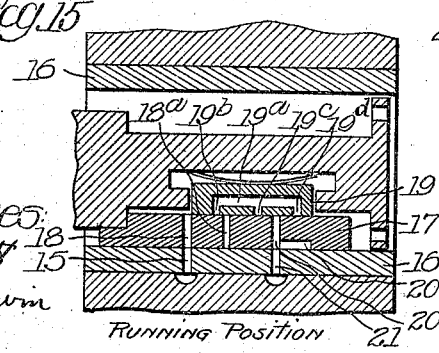
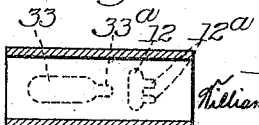

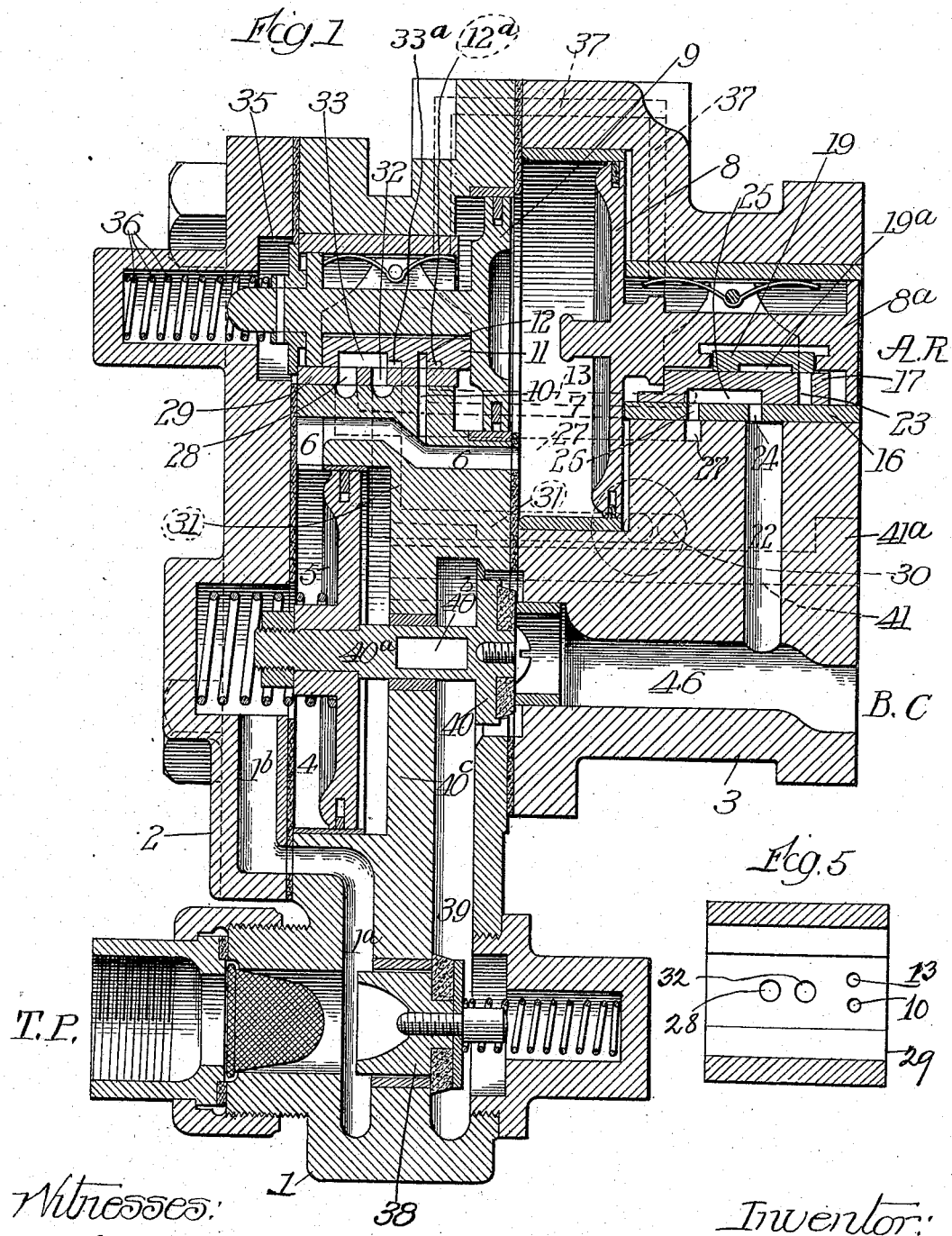

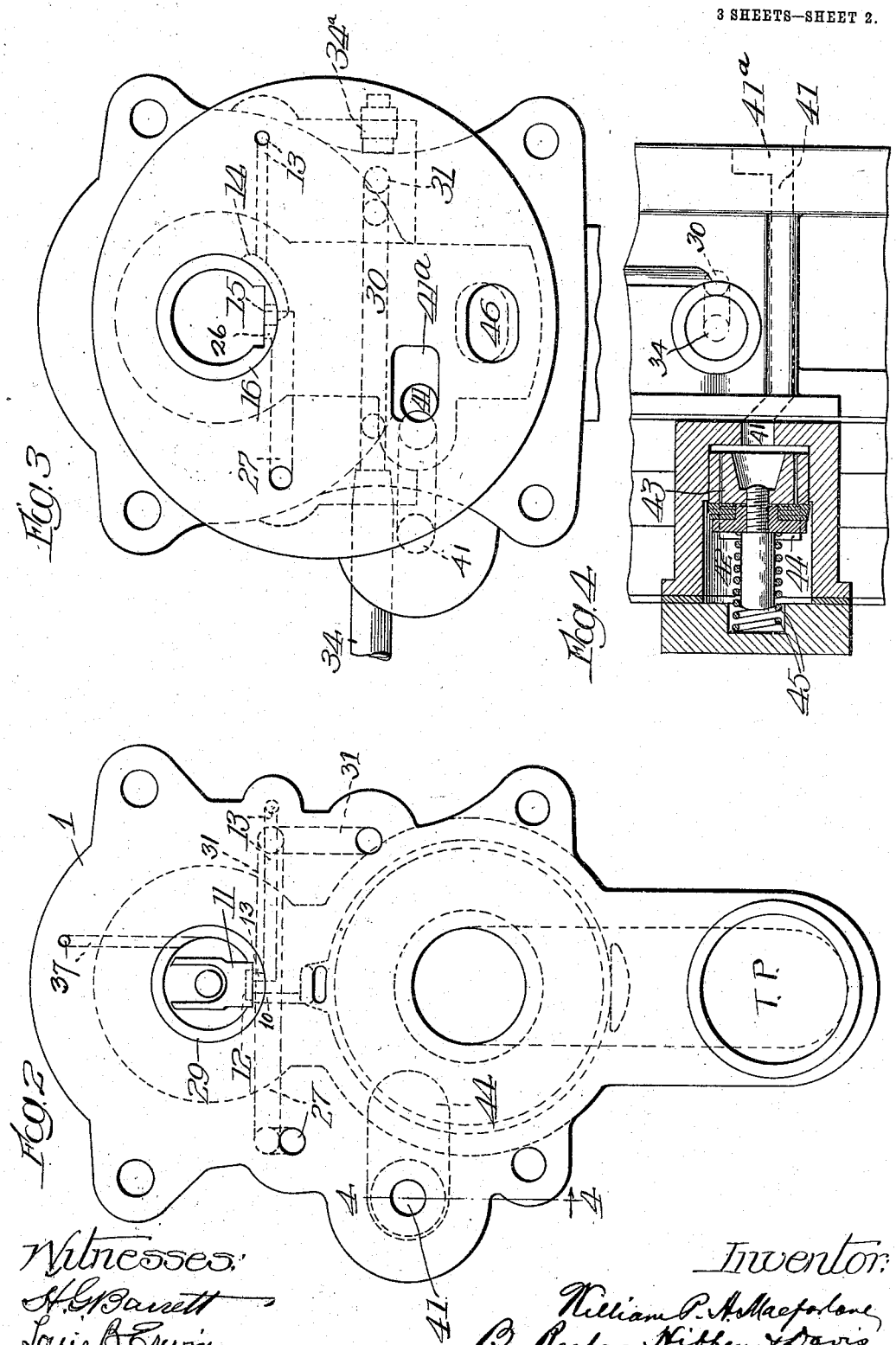

UNITED STATES PATENT OFFICE.

WILLIAM P. A. MACFARLANE, OF CHICAGO, ILLINOIS, ASSIGNOR TO RICHARD FITZGERALD, OF CHICAGO, ILLINOIS.

FLUID-PRESSURE BRAKE.

941,684.        Specification of Letters Patent.       Patented Nov. 30, 1909.

Application filed May 10, 1909. Serial No. 494,954.

*To all whom it may concern:*

Be it known that I, WILLIAM P. A. MACFARLANE, a citizen of the United States, residing at Chicago, in the county of Cook and State of Illinois, have invented certain new and useful Improvements in Fluid-Pressure Brakes, of which the following is a specification.

My invention relates to the valve device commonly referred to as the triple valve for actuating railway brakes and the object thereof is to provide a novel, efficient and reliable valve device of this character, particularly intended and adapted for the proper and efficient braking of long freight trains, where much difficulty has been experienced in the proper setting and releasing of the brakes.

This invention has for its principal object the overcoming of these objections, so that, notwithstanding the number of cars in the train, that is the length of train and consequent great length of train line, the brakes may be set or applied in service or graduated work uniformly throughout the length of the train, whereas heretofore the objection has been that the triple valves nearest the locomotive were the first to be applied, and so on down the length of the train in sequence.

My new valve device is also adapted to overcome the difficulty heretofore existing in the proper releasing of the brakes due to the same cause, that is the length and the friction of the train line, with the result that I am enabled to release the brakes with practical uniformity by retarding the release on the front end of the train.

My present invention is an improvement upon the valve structure described and claimed in a pending application for patent filed by me on January 14, 1908, Serial No. 410,783, for improvements in fluid pressure brakes.

In the drawings Figure 1 is a central vertical section of my valve device; Fig. 2 a side elevation thereof with cap 2 removed; Fig. 3 an elevation of the opposite side of the valve device; Fig. 4 a detail section on line 4—4 of Fig. 2; Fig. 5 a detail view of the valve seat 29 of the release valve; Fig. 6 a bottom plan view of the graduating valve; Fig. 7 a top plan view of the main valve; Fig. 8 a plan view of the seat for the main valve; Fig. 9 a detail view showing the relative position of the graduating and main valves for full service action; Fig. 10 a detail view illustrative of the relative position of such valves upon the first movement of the main piston for causing a restricted preliminary venting of train pipe air to the brake cylinder; Fig. 11 a similar detail view illustrating the position of such valves upon the further movement of the main piston for service action and the consequent movement of the main valve; Fig. 12 a detail view illustrative of the graduating valve in lap position cutting off further admission of the auxiliary reservoir air to the brake cylinder; Fig. 13 a view similar to Fig. 12 but illustrating ports and passages not shown in such latter figure; Fig. 14 a plan view of the release valve; and Fig. 15 a detail view illustrating the valves in running position of the brakes.

Referring to the present embodiment of my invention as shown in the drawings, the valve structure consists of three main parts of which the intermediate parts 1 is one of the main body portions or casing, the part 2 an end cap secured to the casing 1 and the part 3 a body portion secured to the casing 1. The train pipe connection is denoted by the letters T. P., the auxiliary reservoir connection at A. R., and the brake cylinder connection at B. C.

Describing the structure of the valve device and tracing the passage of the motive fluid, that is the air under pressure, the air enters from the train pipe connection and passes through the passages 1ᵃ in the casing 1 to the passage 1ᵇ in the cap 2 and thence enters the piston chamber 4 formed in the casing 1 and accommodating the emergency valve piston 5. The air under pressure passes from the chamber 4 and through passage 6 entering piston chamber in which the service piston 8 is adapted to travel. The air thus admitted from the train line to the piston chamber 7 presses the piston 8 to its normal position to the right illustrated in Fig. 1, and also tends to press a piston 9 to the left, such piston being exposed to the pressure in the chamber 7, but such tendency is resisted in the manner hereinafter explained. From the passage 6 there leads upwardly in the casing 1 a passage 10 governed by a slide valve 11 and adapted to register with a cavity 12 in such valve, such register occurring when the valve is in its normal or running position as illustrated in Fig. 1. This cavity 12 is adapted to connect the port and passage 10 with a port and passage 13 extending downwardly through the bushing 29 forming the seat for the slide valve 11 and thence passing to the left through the casings 1 and 3, where such passage finally communicates with a port 15 opening upon the face of the valve seat formed by the bushing 16 as shown in detail in Fig. 8.

The port 15 is governed by a main valve 17 here shown as a slide valve movable upon said valve seat formed by the bushing 16, but controlled in its movements by the stem 8$^a$ of the piston 8. When this main valve is in its normal or running position shown in Fig. 15 the port 15 communicates with a vertical port and passage 18 extending entirely through the main valve 17 and communicating freely with the auxiliary reservoir through the connection marked A. R. Thus, through the described ports, passages and chambers, the air is fed from the train line into the auxiliary reservoir.

The graduating valve is in the form of a slide valve 19 sliding upon the main valve and having ports and passages adapted to control ports and passages in such main valve as now to be described. This graduating valve is provided with a longitudinal passage or cavity 19$^a$ having three separate branch ports 19$^b$, 19$^c$ and 19$^d$. This graduating valve is also controlled in its movements by the stem 8$^a$ of the piston 8 and when the same is in the normal or running position shown in Fig. 15 its left-hand end uncovers the port 18 so that the feed of air is open from the train line to the auxiliary reservoir. However, upon a reduction of train line pressure for a service or graduating stop the graduating valve is moved to the left, the main valve remaining seated, with the result that the feed port 15 is now placed in communication by means of the ports 19$^b$ and 19$^d$ and cavity 19$^a$ with a vertical port 20 passing entirely through the main valve 17. This port 20, which has an extension 20$^a$ at its lower end for a purpose hereinafter described, in turn communicates with a port 21 passing through the bushing or valve seat 16 and communicating with the large passage 22 leading downwardly to the brake cylinder connection as illustrated more particularly in Figs. 1 and 8. By these means the brake cylinder is given an initial admission of train line pressure with the double advantage of partially filling the brake cylinder with air pressure and of further reducing the train line pressure which will assist in the operation of the succeeding triple valves on the train.

The main valve 17 is provided with a vertical port and passage 23 which is adapted to communicate with a port 24 in the bushing 16 in order to admit the auxiliary reservoir pressure to the brake cylinder through the passage 22 when the main valve is moved sufficiently to the left as shown in Fig. 9 to bring the port 23 in register with the port 24, this position representing the position for the service application of the brakes. The main valve is provided on its under face with a cavity 25 which, when the main valve is in normal position, is adapted to connect the two ports 24 and 26, as shown in Fig. 1. The latter passage connects with a passage 27 leading to the left through the casing 2 and casing 1 and connecting with a port 28 passing through the bushing 29 and forming the seat for the slide valve 11. A passage 30 is formed in the casing 3 and extends to the left, where it communicates with a passage 31 in the casing 1, such latter passage communicating in turn with a port 32 in the bushing 29 and governed by a cavity 33 on the under side of the slide valve 11. When this slide valve is in the normal position shown in Fig. 1 it connects the ports 28 and 32, but in order that such cavity shall still connect with the port 32 when such slide valve and its piston 9 have made their travel to the left, I provide such cavity with an extension 33$^a$ as indicated in Fig. 14 which extension is restricted but allows a small or restricted connection between said passages 28 and 32, in such shifted position of the slide valve.

It will now be understood from the foregoing description that when this slide valve 11 is in its normal position shown in Fig. 1 the cavity 12 therein is in full connection with the passages 10 and 13, with the result that these ports and passages are carrying to their full capacity the train line air to the auxiliary reservoir, but when such slide valve has made its full travel to the left, under conditions hereinafter explained, flow or feed of train line air is restricted by the cavity 12, but such feed is not cut off, inasmuch as such cavity is provided with the small extension 12$^a$ which brings about such restricted feed. A restricted flow of air from the train line to the auxiliary reservoir is thus provided under the conditions referred to. The passage 30 hereinbefore referred to leads to the usual retainer pipe 34 which may connect as shown or at the pipe plug 34$^a$ according to whichever side of the triple valve it is desired to connect such pipe.

As shown in Fig. 1, a collar or flange 35 is fixed to the stem of the piston 9 for the purpose of limiting the movement of such piston toward the right, such flange abutting against the left-hand end of the bushing 29. This collar and consequently the piston is held spring-pressed toward the right with a yielding pressure by means of the spring 36 which abuts this collar to return the piston and valve to normal position after their operation and also to produce the leftward movement of the piston as against train line pressure on its right-hand side. As hereinafter explained this spring 36 has a predetermined tension, the resistance of the spring determining the number of cars at the front end of the train in which the retarding effect shall be produced, say, for instance, from twenty to twenty-five cars for an ordinary length of train.

The piston 9, being exposed to the chamber 7, always has train line pressure on its right-hand side and in order that its opposite side may be exposed to auxiliary reservoir pressure I provide the port 37 leading from the main valve chamber which of course is in communication with the auxiliary reservoir and leading around the piston chamber 7 to a point on the left-hand side of the piston 9 where it empties into the chamber of the slide valve 11 as clearly indicated in Fig. 1.

Describing the emergency valve ports, when such valve is operated as hereinafter explained, the train pipe air enters from the train pipe connection, leaves the check valve 38 and enters the vertical passage 39 in the casing 1. The port which leads from the latter passage to the brake cylinder connection is normally closed by the emergency valve 40 which is mounted on the right-hand end of the stem of the emergency piston 5. This piston is exposed on its left-hand side to the train line pressure in the chamber 4 and in order to supply auxiliary reservoir pressure on its right-hand side, I provide a large passage 41 communicating with the auxiliary reservoir through the large cavity 41$^a$ and extending to the left, Fig. 1, in the casings 3 and 1, to a valve chamber 42, the entrance to which is governed by a spring-pressed check valve 43 as indicated in Fig. 4, the air passing from the chamber 42 through the passage 44 to the emergency piston chamber as shown in Figs. 2 and 4. The check valve 43 is normally held to its seat by means of the spring 45 whose tension is such as to determine the amount of train line reduction that will cause the emergency piston to move to produce emergency action. Speaking briefly of the emergency action, when a proper train line reduction is made the auxiliary reservoir pressure on the right-hand side of the piston 5 lifts the emergency valve 40 from its seat and permits the train line air to pass from the train line connection as described, past such emergency valve and to the brake cylinder through the large passage 46.

Describing the operations of the valve device for the different applications of the brakes, the system having been charged to working pressure, a light train line reduction will cause the main piston 8 to move to the left, carrying with it the graduating valve 19, the first movement of which will close the ports 15 and 18 and thereby cut off the feed from the train line to the auxiliary reservoir. This slight movement of the graduating valve will connect the cavity 19$^a$ thereof with a passage 18 by means of the branch port 19$^b$, which cavity at this time will also connect with the port 20 by means of the branch port 19$^d$ as shown in Fig. 10. As a result the train line air will flow from the train line through passage 10, cavity 12, passage 13, port 15, port 18, port 19$^b$, cavity 19$^a$, ports 19$^d$, 20 and 21 and passage 22 to the brake cylinder, thereby causing a quick train line reduction which will move the main piston 8 to its full travel to the left, carrying the main valve with it to the position shown in Figs. 9 and 11. This movement of the parts will close the described communication directly between the train line and the brake cylinder through the port 18, but such communication is reëstablished from the train line to the brake cylinder through the port 18$^a$, cavity 19$^a$ and thence to the brake cylinder through the same passages as before with the exception that the extension or cavity 20$^a$ of the port 20 is now brought into use in order to connect such latter port with the port 21. At the same time this described shifting of the main valve to the left has brought this port 23 in register with the port 24 so that the full volume of auxiliary reservoir air flows to the brake cylinder through the passage 22, Fig. 9. However, as the port 23 is of much larger carrying capacity than the described passages for the direct admission of train line air to the brake cylinder, the reservoir pressure will be reduced faster than the train line and when such reservoir pressure is reduced below the train line pressure, such latter pressure acting against the left-hand side of the main piston 8 will move it to the right carrying the graduating valve with it. Upon such movement this graduating valve will close the passage 23 in the main valve and also the passage 18$^a$, as illustrated by Figs. 12 and 13, thereby cutting off the flow of reservoir and train line air to the brake cylinder. A slight reduction in the train line will cause the same process to be repeated until equalization obtains between the reservoir and the brake cylinder pressures.

Referring to the release of the brakes, in a long train, the train line pressure builds up rapidly in the front end of the train line, such pressure in the front end of the trains manifesting itself rapidly between the two pistons 8 and 9 and moving the piston 8 to the right, carrying the main valve to release position, at which time the cavity 25 in the main valve connects passages 24 and 26, with the result that the air from the brake cylinder will flow through said cavity and said passages and through the passage 27 to the cavity 33 in the slide valve 11, thence through passages 31 and 30 and finally to the atmosphere at 34, thereby releasing the brakes. In the front end of the train, where the train line pressure increases rapidly upon a restoration of the train line pressure, as described, the piston 9 will move to the left, carrying the slide valve 11 in the same direction, with the result that the cavity 33 will be partially closed off from the passages 28 and 32, the passage being restricted to the extent of the restricted portion 33ª so that the venting of the brake cylinder pressure will be retarded. Also, in this movement of the slide valve 11 the cavity 12 will be partially closed, inasmuch as the restricted portions 12ª are now called into use and the feeding of train line air to the reservoir will likewise be retarded. At this time the graduating valve will be in its normal position uncovering the feed port 18, but the feed will be retarded for the reason just stated.

When the auxiliary reservoir has been filled to train line pressure less the resistance of the spring 36, the piston 9, which may be referred to as the retarding piston, will move to the right and the cavity 33 in its valve 11 will thereupon fully open ports 28 and 32, whereupon the brakes will quickly release. This same movement will fully connect the cavity 12 in the slide valve 11 with the passage 10 and the reservoir will be quickly recharged. In all of these operations the passage 37 has maintained an equal pressure on the right-hand side of the main piston and on the left-hand side of the retarding piston.

In the rear part of the train where the train line builds up slowly, the pressure will move the main piston 8 to its full travel to the right, opening the release ports. The train line pressure, however, will not build up fast enough to move the retarding piston to the left and the cavity 33 will not close the passages 28 and 32, with the result that the brakes will quickly release and the cavity 12 will not be closed to the passage 10 and the train line air will flow quickly to the auxiliary reservoir.

In the emergency application of the brakes the sudden reduction in the train line pressure will cause the main piston 8 to move quickly to its full travel to the left, thereby venting train line and reservoir air to the brake cylinder in the manner above explained, and at the same time this sudden reduction of train line air will so reduce the pressure in the chamber 4 on the left-hand side of the emergency piston 5 as to cause it to move to its full travel to the left, thereby lifting the emergency valve 40 from its seat. The check valve 38 will now lift and the train line air will flow past such check valve and through passage 39, past the emergency valve 40 and through passage 46 to the brake cylinder; this sudden venting of the train pipe air causing the successive action of the brakes on the succeeding cars throughout the entire length of the train in the usual and well known manner. The full movement of the emergency piston to the left will withdraw the cavity 40ᵇ in the stem 40ª to the left, making a passage past the partition 40ᶜ which will afford a large passage from the auxiliary reservoir to the brake cylinder through the passage 41, past valve 43, chamber 42, passage 44, cavity 40ᵇ and passage 46 to the brake cylinder, whereby the equalization between the auxiliary reservoir and the brake cylinder will quickly occur. The seating of the emergency piston will prevent the reservoir and brake cylinder pressures from returning to the train line and the check valve 38 will perform the same function. Upon a restoration of the train line pressure to equal the reservoir pressure the emergency piston will move to the right to its normal or running position and the air will pass through passage 6, and entering chamber 7 will move the main piston 8 to the right and the brakes will release through the passages 27, cavity 33 and passages 30 and 31.

If the car equipped with my valve device is in the front end of the train where the train line pressure builds up rapidly, the retarding piston 9 will move to the left and the slide valve 11 will partially close passages 32 and 28 and the release of the brakes on the front end of the train will be retarded in the manner already explained and likewise the cavity 12 will restrict the train line feed from the port and passage 10 so that the train line air will feed slowly to the reservoir. This slow feed to the reservoir will cause the train line to flow quickly toward the rear end of the train, as the triple valves at the front end of the train will prevent the reservoirs from absorbing all of the increased train line pressure. Toward the rear end of the train line the pressure builds up slowly as described, so that the retarding piston will not be moved to the left leaving the release passages fully open for a quick release and likewise leaving the re-charging passages fully open for a quick recharging of the auxiliary reservoir.

I claim:

1. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir and arranged, upon a sudden increase of the train line pressure, to produce a slow recharge of the auxiliary reservoir and, on a slow increase of train line pressure, to permit a quick release of air from the brake cylinder and a quick recharge of the auxiliary reservoir.

2. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir and arranged, upon a sudden increase of the train line pressure, to produce a slow recharge of the auxiliary reservoir and, on a slow increase of train line pressure, to permit a quick release of air from the brake cylinder and a quick recharge of the auxiliary reservoir, and a graduating valve arranged to control the venting of train line pressure to the brake cylinder in service applications of the brakes.

3. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and arranged, when moved from normal position, to restrict said feed and release, and a movable abutment subject to the fluctuations in the train line pressure and adapted to be moved thereby when the train line pressure is increased suddenly.

4. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir and arranged, when moved from normal position, to restrict said feed and release, a movable abutment subject to the fluctuations in the train line pressure and adapted to be moved thereby when the train pressure is increased suddenly, and a spring of a predetermined tension acting on one side of said abutment against the train line pressure on the other side.

5. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir and arranged, when moved from normal position, to restrict said feed and release, a movable abutment subject to the fluctuations in the train line pressure and adapted to be moved thereby when the train pressure is increased suddenly, and a spring of a predetermined tension action on one side of said abutment against the train line pressure on the other side, said abutment being exposed to auxiliary reservoir pressure on the spring side and acting in conjunction with such spring.

6. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and arranged, when moved from normal position, to restrict said feed and release, and a movable abutment subject to the fluctuations in the train line pressure and adapted to be moved thereby when the train line pressure is increased suddenly, and a spring tending to hold such retarding valve in normal position, the degree of resistance of the spring determining the number of cars in the front end of the train wherein the retarding effect shall be produced.

7. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and arranged, when moved from normal position, to restrict said feed and release, and a movable abutment subject to the fluctuations in the train line pressure and adapted to be moved thereby when the train line pressure is increased suddenly, and separate movable abutments for independently operating said main valve and retarding valve.

8. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and arranged, when moved from normal position, to restrict said feed and release, and a movable abutment subject to the fluctuations in the train line pressure and adapted to be moved thereby when the train line pressure is increased suddenly, and separate movable abutments for independently operating said main valve and retarding valve, both abutments being exposed on opposite sides to train line pressure and auxiliary reservoir pressure respectively.

9. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and arranged, when moved from normal position, to restrict said feed and release, and a movable abutment subject to the fluctuations in the train line pressure and adapted to be moved thereby when the train line pressure is increased suddenly, and separate movable abutments for independently operating said main valve and retarding valve, both abutments being exposed on one side to train line pressure in the same chamber and on the other side from auxiliary reservoir pressure.

10. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and arranged, when moved from normal position, to restrict said feed and release, and a movable abutment subject to the fluctuations in the train line pressure and adapted to be moved thereby when the train line pressure is increased suddenly, and separate movable abutments for independently operating said main valve and retarding valve, both abutments being exposed on opposite sides to train line pressure and auxiliary reservoir pressure respectively, and a spring acting on the retarding valve abutment on the auxiliary reservoir side thereof and of a tension to hold the retarding valve in normal position but to yield to a sudden preponderance of train line pressure over auxiliary reservoir pressure.

11. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and arranged, when moved from normal position, to restrict said feed and release, and a movable abutment subject to the fluctuations in the train line pressure and adapted to be moved thereby when the train line pressure is increased suddenly, said retarding valve being in the form of a slide valve with regular cavities for the full feed and release and restricting cavities for the restricted feed and release.

12. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and arranged, when moved from normal position, to restrict said feed and release, and a movable abutment subject to the fluctuations in the train line pressure and adapted to be moved thereby when the train line pressure is increased suddenly, said retarding valve being in the form of a slide valve with controlling cavities for the full feed and release, said cavities having extensions of restricted carrying capacity for the restricted feed and release.

13. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and a graduating valve arranged to close the feed to the auxiliary reservoir upon its first movement and to vent train line pressure to the brake cylinder.

14. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir, and a graduating valve arranged to close the feed to the auxiliary reservoir upon its first movement and to vent train line pressure to the brake cylinder, said main valve and graduating valve being in the form of slide valve movable upon each other.

15. In combination with triple valve mechanism for controlling ports and passages for the feed from the train line to the brake cylinder for the admission of air from auxiliary reservoir to the brake cylinder, and for release of air from the brake cylinder, a retarding valve for independently controlling those passages concerned with the feed to and release from the brake cylinder, said retarding valve when in normal position not interfering with said passages but, when operated upon a sudden increase of train line pressure, arranged to restrict said passages.

16. In combination with triple valve mechanism for controlling ports and passages for the feed from the train line to the brake cylinder for the admission of air from auxiliary reservoir to the brake cylinder, and for release of air from the brake cylinder, a retarding valve for independently controlling those passages concerned with the feed to and release from the brake cylinder, said retarding valve when in normal position not interfering with said passages but, when operated upon a sudden increase of train line pressure, arranged to restrict said passages, and a spring tending to hold the valve in its said normal position and determining the degree of train line increase before operation of the valve.

17. In combination with triple valve mechanism for controlling ports and passages for the feed from the train line to the brake cylinder, for the admission of air from auxiliary reservoir to the brake cylinder, and for the release of air from the brake cylinder, a retarding valve for independently controlling those passages concerned with the feed to and release from the brake cylinder, said retarding valve when in normal position not interfering with said passages but, when operated upon a sudden increase of train line pressure, arranged to restrict said passages, a movable abutment for operating said valve and exposed on opposite sides to train line pressure and auxiliary reservoir pressure respectively, and a spring acting on the auxiliary reservoir pressure side of the abutment and acting in conjunction therewith to hold the valve and abutment in normal position.

18. In a device for actuating fluid pressure brakes, a main valve arranged to admit air pressure from the auxiliary reservoir to the brake cylinder and to release the air pressure from the brake cylinder, in combination with a retarding valve coöperating with the main valve to control said release of pressure and the feed to the auxiliary reservoir and arranged, upon a sudden increase of the train line pressure, to produce a slow recharge of the auxiliary reservoir and, on a slow increase of train line pressure, to permit a quick release of air from the brake cylinder and a quick recharge of the auxiliary reservoir, a graduating valve arranged to control the venting of train line pressure to the brake cylinder in service applications of the brakes, and an emergency device comprising an emergency valve and a check valve acting independently of the main valve and in emergency action arranged to open a larger passageway for flow of reservoir air to the brake cylinder than occurs in a graduated setting of the brakes.

19. In combination with triple valve mechanism for controlling ports and passages for the feed from the train line to the brake cylinder, for the admission of air from auxiliary reservoir to the brake cylinder, and for the release of air from the brake cylinder, and an emergency device comprising an emergency valve and a check valve acting independently of the main valve and in emergency action, arranged to vent train line pressure to the brake cylinder and to open a larger passageway for flow of reservoir air to the brake cylinder than by said triple valve mechanism.

20. In combination with triple valve mechanism for controlling ports and passages for the feed from the train line to the brake cylinder, for the admission of air from auxiliary reservoir to the brake cylinder, and for the release of air from the brake cylinder, and an emergency device comprising an emergency valve and a movable abutment therefor acting independently of the main valve and in emergency action arranged to vent train line pressure to the brake cylinder and to open a larger passageway for flow of reservoir air to the brake cylinder than by said triple valve mechanism, and a check valve in said passageway to determine the train line reduction to produce emergency action.

WILLIAM P. A. MACFARLANE.

Witnesses:
LOUIS B. ERWIN,
ROBERT H. DOBBERMAN.